United States Patent
Weber et al.

(10) Patent No.: US 7,191,662 B2
(45) Date of Patent: Mar. 20, 2007

(54) POLYMER-BASED SENSOR APPARATUS AND METHOD

(75) Inventors: Thomas E. Weber, Lisle, IL (US); William L. Olson, Lake Villa, IL (US)

(73) Assignee: Motorola, Inc., Schaumburg, IL (US)

( * ) Notice: Subject to any disclaimer, the term of this patent is extended or adjusted under 35 U.S.C. 154(b) by 189 days.

(21) Appl. No.: 10/457,691

(22) Filed: Jun. 9, 2003

(65) Prior Publication Data
US 2004/0244495 A1 Dec. 9, 2004

(51) Int. Cl.
G01B 7/16 (2006.01)
(52) U.S. Cl. ..................................................... 73/775
(58) Field of Classification Search .................. 73/760, 73/763, 768, 769, 775, 776, 788, 789, 762, 73/777, 716
See application file for complete search history.

(56) References Cited

U.S. PATENT DOCUMENTS

| | | | | |
|---|---|---|---|---|
| 4,493,531 A | * | 1/1985 | Bohmer et al. | 349/143 |
| 4,974,596 A | * | 12/1990 | Frank | 73/726 |
| 5,060,527 A | * | 10/1991 | Burgess | 73/862.68 |
| 5,440,193 A | * | 8/1995 | Barrett | 73/775 |
| 5,835,142 A | * | 11/1998 | Nakamura et al. | 348/335 |
| 5,994,997 A | | 11/1999 | Brown et al. | |
| 6,060,811 A | * | 5/2000 | Fox et al. | 310/311 |
| 6,171,921 B1 | | 1/2001 | Dunn et al. | |
| 6,229,098 B1 | | 5/2001 | Dunn et al. | |
| 6,256,866 B1 | | 7/2001 | Dunn | |
| 6,292,674 B1 | * | 9/2001 | Davis | 455/550.1 |
| 6,386,023 B1 | * | 5/2002 | Sajna et al. | 73/146 |
| 6,424,339 B1 | * | 7/2002 | Randall | 345/173 |
| 2003/0134063 A1 | * | 7/2003 | Vance et al. | 428/35.7 |
| 2004/0130528 A1 | * | 7/2004 | Baker et al. | 345/161 |

OTHER PUBLICATIONS

"Motorola Adavanced Technology Center Users Guide: Strain Gage Data Acquisition System", © 2003 Motorola, Inc. (22 pp).
Savic, John, Croswell, Robert T., Tungare, Aroon, Dunn, Greg, Tang, Tom, Lempkowski, Robert, Zhang, Max, and Lee, Tien, "Embedded Passives Technology Implementation in RF Applications", presented at the IPC Printed Circuit Expo, Long Beach, California, Mar. 25-28, 2002, reprinted in Circuitree, 15 (6), p. 10, 2002 (7 pp).
"PTF Applications", © 2002 PolyMore Circuit Technologies, LP, retrieved Jan. 8, 2004 from the Internet at http://polymore.com/PTF_Technology/PTF_Applications/ptf_applications.html (2 pp).
"FSR Data Sheet", Sep. 21, 2002, retrieved Jan. 8, 2004 from the Internet at http://www.androidworld.com/prod59.htm (3 pp).
"Thick Film Materials for Sensors", retrieved Jan. 8, 2004 from the Internet at http://www.dupont.com/mcn/product/tf4sensors.html (4 pp).

* cited by examiner

Primary Examiner—Max Noori

(57) ABSTRACT

A strain sensor (10) includes a flexible substrate (11) having one or more polymer-based resistive elements (12) at least partially conformably disposed thereon. Two or more conductive leads (13, 14) are electrically coupled to the resistive element. Flexure of the resistive element causes a corresponding alteration in a measurable electrical property of the resistive element, such as its characteristic impedance. User interfaces of various kinds can be fabricated with such strain sensors.

25 Claims, 3 Drawing Sheets

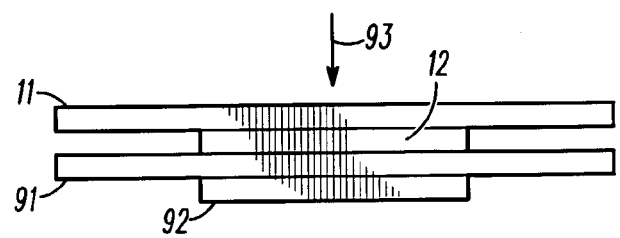
FIG. 9
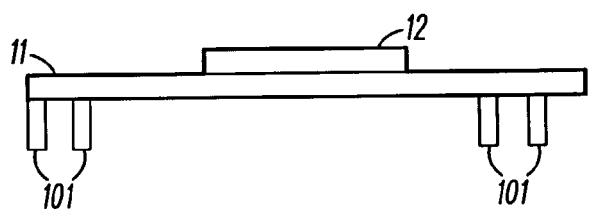
FIG. 10
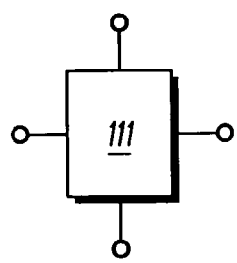 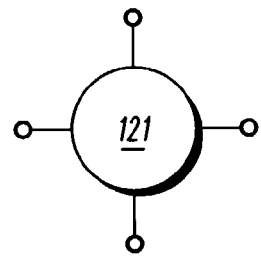
FIG. 11     FIG. 12
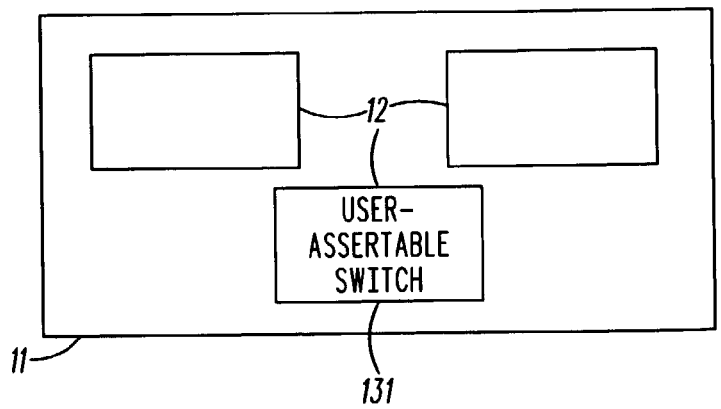
FIG. 13

POLYMER-BASED SENSOR APPARATUS AND METHOD

TECHNICAL FIELD

This invention relates generally to sensor apparatus and methods.

BACKGROUND

Sensors of various kinds are known in the art. Some sensors respond to strain as imparted through mechanical pressure. One example of a known strain sensor comprises a thin metal foil disposed on a flexible substrate (comprised, for example, of polyimide material). The electrical resistance of such a strain sensor changes upon bending the metal foil and this change in resistance can serve as indicia of the corresponding strain.

Unfortunately, such embodiments are not wholly satisfactory for many purposes. For example, such sensors are readily damaged when extended too far. In general, such sensors work best when applied to a substantially flat surface. Affixing such a sensor to a given surface often requires a time-consuming process involving the application and curing of a suitable adhesive. And, at approximately five U.S. dollars or more per sensor, these prior art sensors are relatively expensive. Of course their cost becomes particularly commercially prohibitive as the number of sensors to be deployed on or with a given product increases.

As a result, such strain sensors tend to be used only relatively rarely and usually in circumstances where another kind of sensor will simply not suffice.

BRIEF DESCRIPTION OF THE DRAWINGS

The above needs are at least partially met through provision of polymer-based sensor apparatus and method described in the following detailed description, particularly when studied in conjunction with the drawings, wherein:

FIG. 9 comprises a side elevational view as configured in accordance with yet another embodiment of the invention;

FIG. 10 comprises a side elevational view as configured in accordance with yet another embodiment of the invention;

FIG. 11 comprises a top plan view as configured in accordance with another embodiment of the invention;

FIG. 12 comprises a top plan view as configured in accordance with another embodiment of the invention;

FIG. 13 comprises a top plan as configured in accordance with yet another embodiment of the invention;

Figure 1:
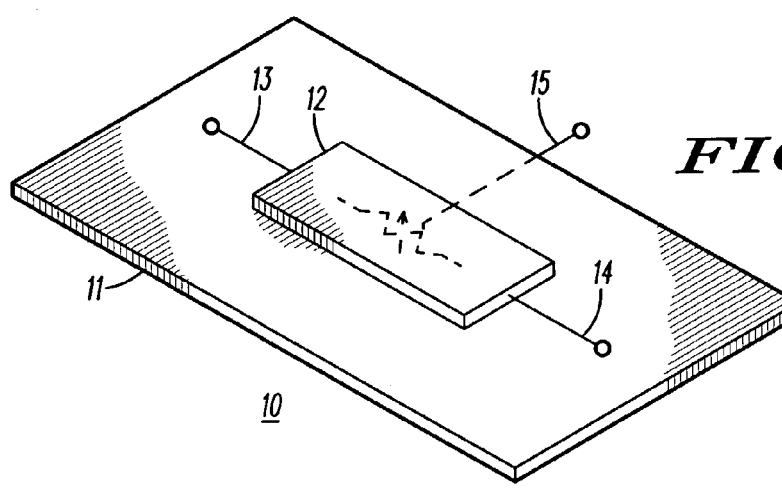
FIG. 1 comprises a perspective view as configured in accordance with certain embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

Generally speaking, pursuant to these various embodiments, a strain sensor can be comprised of a flexible substrate having at least a first polymer-based resistive element at least partially conformably disposed thereon with a first and second conductive lead being electrically coupled to the resistive element. In a preferred embodiment, the polymer-based resistive element comprises carbon-filled material such as a carbon-filled thermoplastic material or thermoset material. In various embodiments, additional conductive leads can be utilized and/or the polymer-based resistive element (or elements) can be disposed on a first side of the flexible substrate, on an opposing side of the flexible substrate, or on both sides of the flexible substrate. In other embodiments, the flexible substrate itself can be of substantially uniform thickness or can have portions (such as a portion that is proximal to the polymer-based resistive element) that have a reduced thickness relative to other portions of the flexible substrate. In yet another embodiment, a rigidizer can be used to provide increased support for the flexible surface and/or a stop surface can be positioned proximal to the resistive element.

These and other embodiments described herein can be utilized, for example, to serve as an input mechanism for a user. A change in a monitored electrical characteristic of the polymer-based resistive element (such as, for example, in the impedance of the polymer-based resistive element) can be detected and interpreted as corresponding to indicia of a particular user input. Depending upon the embodiment, this can include interpreting the change as a corresponding user input command (such as, for example, a user input command for a corresponding handheld two-way communications device). In addition, or in lieu thereof, this can also include interpreting the change as a corresponding indicia of a particular characteristic manner by which a given user physically interacts with a given corresponding monitored device (again, such as a handheld two-way communications device).

Such embodiments generally tend to facilitate provision of a relatively robust and inexpensive strain sensor. The resultant strain sensor can be conformably disposed on a variety of monitored platforms, including disposition on substantially non-planar surfaces. These embodiments are also readily amenable to a variety of alternative configurations, thereby facilitating a readily adaptable and flexible tool. In addition, such embodiments permit imbuing a given platform with capabilities not previously feasibly considered.

Referring now to the drawings, and in particular to FIG. 1, a first embodiment of a strain sensor 10 includes a flexible substrate 11 comprised, for example, of a thin plastic material such as Kapton. Other materials might suffice as well, including for example, certain paper materials. For most purposes, this flexible substrate 11 should probably comprise a relatively poor conductor of electricity.

This flexible substrate 11 has a first polymer-based resistive element conformably disposed (at least in part) thereon. In this particular embodiment, the polymer-based resistive element 12 has a substantially rectangular shape (as will be illustrated below, other shapes are also possible and possibly preferable in certain settings or applications). In a preferred embodiment, the polymer-based resistive element 12 comprises, for example, a thermoplastic or thermoset material (as are well understood in the art) having carbon material disposed therein (again as is available and otherwise as is well understood in the art). Also in a preferred approach, the polymer-based resistive element 12 is applied pursuant to a printing process, again as well understood in the art. The polymer-based resistive element 12 can be sized as appropriate to meet the needs of a given setting, but can, for example, be as small as about 2 or 3 millimeters in width. In general, a larger polymer-based resistive element 12 will yield a resultant device that exhibits greater sensitivity to the assertion of mechanical pressure.

Pursuant to a preferred approach, at least two conductive leads 13 and 14 are electrically coupled to the polymer-based resistive element 12. These leads 13 and 14 can be comprised, for example, of copper wire or other suitable substitute such as plated or etched copper or solder interconnect structures. So configured, these leads 13 and 14 permit a voltage to be applied across the polymer-based resistive element 12. Physical alteration of the polymer-based resistive element 12 will induce a corresponding change in the impedance, and particularly the resistance, of the polymer-based resistive element 12. In particular, when this material compresses, the electrical resistance of the polymer-based resistive element 12 decreases. Conversely, when this material stretches, the electrical resistance of the polymer-based resistive element 12 increases. In general, these changes may be relatively small (on the order of, for example, a one percent change) over a useful or anticipated range of compression and/or flexure, but nevertheless large enough to permit reliable detection thereof. Also, in general, this response of the polymer-based resistive element 12 will tend to be relatively linear over a significantly useful operating range.

As described, the strain sensor 10 includes only a first and a second conductive lead 13 and 14. Such a configuration will suffice for many useful applications. There may be circumstances, however, when additional leads (and hence additional measuring points) may be beneficial. To illustrate, an optional third conductive lead 15 can be provided at the approximate midpoint of the polymer-based resistive element 12 to permit an increased number of measuring and detecting possibilities.

Figure 2:
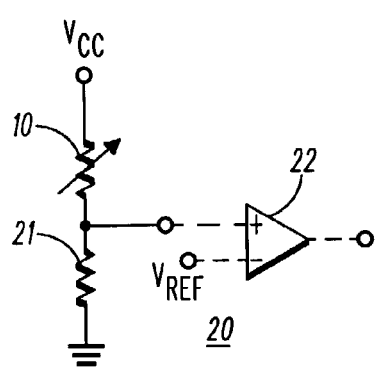
FIG. 2 comprises a schematic view as configured in accordance with certain embodiments of the invention.

Referring now to FIG. 2, a strain detection circuit 20 can comprise a voltage divider that places a resistor 21 in series with the strain sensor 10 between a voltage source $V_{cc}$ and ground. Upon compressing the polymer-based resistive element 12 of the strain sensor 10, the resistance of the polymer-based resistive element 12 will drop. In a corresponding way, the voltage at the node between the two resistors 10 and 21 will increase. This increasing voltage serves, in this embodiment, as indicia of the compression of the strain sensor 10. Other circuitry can serve to permit measurement of this voltage and hence the corresponding change of impedance and hence compression of the polymer-based resistive element 12 of the strain sensor 10. For example, as illustrated, one can optionally utilize a comparator 22 to compare this monitored value against a predetermined threshold value. When the monitored value exceeds this threshold, the resultant signal can indicate that the strain sensor 10 has undergone at least a predetermined degree of flexure.

Figure 3:
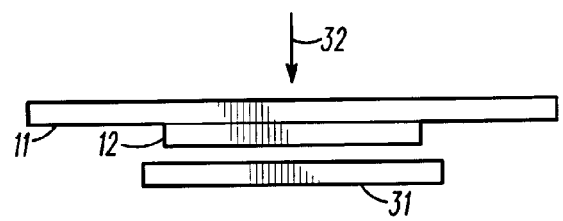
FIG. 3 comprises a side elevational view as configured in accordance with another embodiment of the invention.
Figure 4:
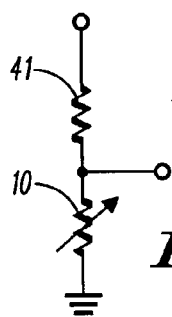
FIG. 4 comprises a schematic view as configured in accordance with an embodiment of the invention.

In the above-described embodiment, flexure of the strain sensor 10 by imposition of mechanical pressure on the polymer-based resistive element 12 results in compaction of the polymer-based resistive element 12 and a corresponding reduction in the electrical resistance presented thereby. Referring now to FIG. 3, it is also possible to impose mechanical pressure 32 on the strain sensor 10 from the opposite side of the flexible substrate 11. This will result in a stretching or tensile response of the polymer-based resistive element 12 and a corresponding increase in the electrical resistance presented by the polymer-based resistive element 12. When using the strain sensor 10 in such an application, and referring momentarily to FIG. 4, it may be desirable to reposition the strain sensor 10 in the voltage divider circuit that can be used to detect flexure of the strain sensor 10. In particular, the strain sensor 10 can occupy the lower position and the fixed-value resistive element 41 can occupy the upper position in the voltage divider circuit.

Referring again back to FIG. 3, in some applications it may be desirable to discourage or prevent the strain sensor 10 from achieving too great a state of flexure (for example, the flexible substrate 11 and/or the polymer-based resistive element 12 may be damaged by too great a movement). In such a case one can position one or more stop surfaces to limit the extent to which the strain sensor 10 can be flexed. For example, as illustrated, a stop surface 31 comprising a plate can be positioned proximal to but not touching the polymer-based resistive element 12. The gap between the polymer-based resistive element 12 and the stop surface 31 permits some flexure of the strain sensor 10, but the stop surface 31 prohibits the strain sensor 10 from being flexed beyond the boundary of the gap. If desired, the stop surface can itself be resiliently biased such that, at least over some range of travel, the stop surface will resist but not fully prohibit further movement due to flexure of the strain sensor 10.

Figure 5:
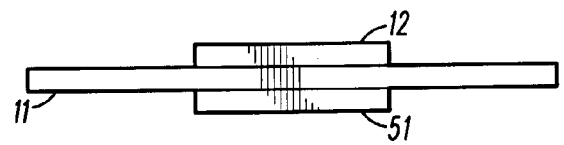
FIG. 5 comprises a side elevational view as configured in accordance with another embodiment of the invention.
Figure 6:
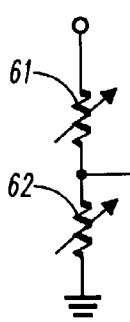
FIG. 6 comprises a schematic view as configured in accordance with an embodiment of the invention.

In the embodiments described above, the polymer-based resistive element 12 is disposed on one side or the other of the flexible substrate 11. If desired, a polymer-based resistive element can be disposed on both sides of the flexible substrate 11. For example, and referring now to FIG. 5, a first polymer-based resistive element 12 can be disposed as described above on a first side of the flexible substrate 11 and a second polymer-based resistive element 51 can be disposed on the opposing side of the flexible substrate 11. In a preferred embodiment, the two polymer-based resistive elements are disposed substantially opposite one another. So configured, the two polymer-based resistive elements can work in tandem to sense the application of mechanical pressure. For example, with reference to FIG. 6, the polymer-based resistive element 51 on the underside of the flexible substrate 11 can occupy the upper resistive element 61 position of a voltage divider circuit and the polymer-based resistive element 12 on the upper side of the flexible substrate 11 can occupy the lower resistive element 62 position of the voltage divider circuit. So configured, greater sensitivity to the presence of mechanical pressure may be attained in at least some applications.

Figure 7:
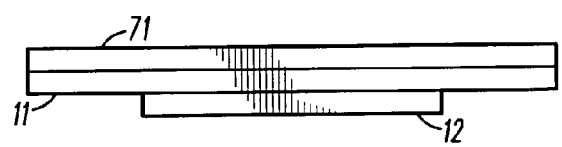
FIG. 7 comprises a side elevational view as configured in accordance with another embodiment of the invention.

In some applications, such a strain sensor may be positioned to detect the presence or absence of mechanical pressure as may be exerted by, for example, another component or constituent element of some device or apparatus. In other applications, however, such strain sensors can serve as a user input interface such as a keyboard. To facilitate such an application, it may be desirable to include text or other graphics or indicia in conjunction with the strain sensor to thereby inform a user of the particular input character or purpose that corresponds to a given strain sensor/key. When fielding an embodiment such as the one described above with respect to FIG. 3, such indicia can be disposed on the side of the flexible substrate 11 that is opposite the polymer-based resistive element 12. As an alternative, an additional layer or membrane 71 can be disposed over the strain sensor as illustrated in FIG. 7. This additional layer 71 can be disposed on either (or both) sides of the flexible substrate 11 and can host the desired indicia.

Figure 8:
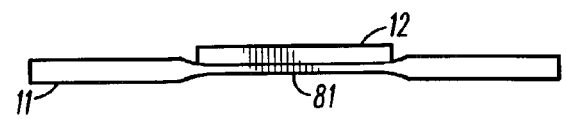
FIG. 8 comprises a side elevational view as configured in accordance with another embodiment of the invention.

In the embodiments described above, the flexible substrate 11 has been presented as being of substantially uniform thickness. For some applications it may be desirable to use a flexible substrate 11 having non-uniform thickness. For example, and referring now to FIG. 8, it may be helpful in some applications to use a flexible substrate 11 having an area 81 of reduced thickness proximal to the polymer-based resistive element 12. So configured, the resultant strain sensor may be more physically sensitive to the exertion of presence of mechanical flexure. As another example, certain areas of the flexible substrate 11 may be of increased thickness (not shown). Such increased thickness may serve to decrease sensitivity to mechanical pressure and/or to realize a strain sensor that is less susceptible to damage due to the exertion of mechanical flexure.

For some applications, it may be desirable to stack such strain sensors. For example, as illustrated in FIG. 9, a second flexible substrate 91 bearing a second polymer-based resistive element 92 can be disposed proximal and substantially parallel to the flexible substrate 11 described above. Further, in this embodiment, the two polymer-based resistive elements are substantially aligned with one another to yield a stack of resistive elements 12 and 92 that are responsive to a single point of mechanical pressure 93.

The use of one or more stop surfaces to inhibit or prohibit movement of the polymer-based resistive element 12 beyond a certain point has already been noted above. For some applications, it may be desired to also provide external support to one or more parts of the flexible surface 11. For example, and referring now to FIG. 10, a ridgidizer comprised in this embodiment of a plurality of substantially rigid elements 101 can be disposed proximal to or in contact with the flexible substrate 11 to resist downward movement of the flexible substrate 11 in local regions. Such rigid elements 101 can be substantially independent of one another or can be part of an integral structure such as, for example, a honeycomb-styled element. It should also be understood that such ridgidizers can be used with or without one or more stop surfaces as described above.

In the embodiments illustrated above, the polymer-based resistive element appears in a substantially rectangular form and indeed, for many purposes, a rectangular shape is likely preferable. There may be some circumstances, however, when other shapes are not only possible but preferable. For example, with reference to FIG. 11, the polymer-based resistive element 111 can be substantially configured as a square. It should also be noted that, as with the rectangular form factor, more than two conductive elements could be used if desired. For example, two pairs of opposing conductive elements could be utilized as illustrated. So configured, one pair of conductive elements could serve, for example, as a back-up for the other pair of conductive elements.

As yet another example of an alternative form factor, the polymer-based resistive element 121 can be substantially formed as a circle as illustrated in FIG. 12. And again, more than two conductive electrodes can be utilized if desired. It should be noted that such a configuration would likely provide a less linear response than, for example, a rectangular shape. Such non-linearity may be usefully exploited, however, to suit the unique needs or attributes of a given application.

In the embodiments described above, a single flexible substrate 11 hosts a single strain sensor 10. If desired, of course, a single flexible substrate 11 can support a plurality of strain sensors. For example, as illustrated in FIG. 13, a single flexible substrate 11 can have three polymer-based resistive elements 12 disposed thereon as taught herein, with each such polymer-based resistive element 12 comprising a discrete strain sensor (in this illustration the conductive leads are not depicted). When deploying such a multi-sensor apparatus, the different strain sensors can serve to support differing functions. To illustrate, two of the polymer-based resistive elements 12 depicted in FIG. 13 can serve as strain sensors to detect the general presence of mechanical pressure while a third one of the polymer-based resistive elements 12 can serve as a specific user-assertable switch 131 (such as, for example, an on/off switch).

It should be understood that any of the earlier described embodiments can be implemented in conjunction with one or more of such multiple strain sensors as formed using a single flexible substrate.

Figure 14:
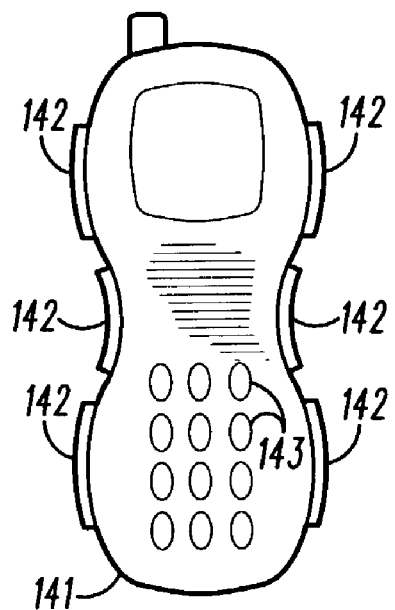
FIG. 14 comprises a front elevational view of a handheld two-way communication unit as configured in accordance with an embodiment of the invention.

As already noted, such strain sensors can be conformably disposed on a variety of surfaces including non-planar surfaces. It has also been noted that such strain sensors can be tasked in differing ways. As one illustration, and referring now to FIG. 14, a handheld wireless communication device 141 such as a cellular telephone can have a plurality of such strain sensors disposed about the exterior surface thereof. For example, a plurality of strain sensors 142 can be conformably disposed about the edges of the device 141. So positioned, one or more of the strain sensors 142 can detect when the device 141 is gripped by a user. Such detection can serve a variety of purposes. For example, the device 141 can be switched from one state of operation (such as a reduced current drain state of operation) to a different state of operation (such as an increased current drain state of operation) in response to the detection, via these strain sensors 142, that a user is gripping the communication device 141. As another example, such multiple sensors 142 can be used to detect a characteristic way (or ways) by which a given user tends to grip this device 141 during use. This information could then be used, for example, as a security feature to facilitate restricting full or partial use of the device 141 to only a given individual (or individuals). The exact location and force/pressure distribution on the device 141, which can be a relatively distinct human factors signature for a given individual, or trained for a group of individuals, would provide heretofore unrealized security capability for personal electronic devices. When used as a keypress interface device, the multiple sensors can be operated in an analog or digital modality. In a digital mode, exceeding a particular threshold level would activate a given response, such as text entry of the number 9. Pressures above this level would return the same character value. Operated in an analog mode, several character values could be returned upon actuation of a given key based on the applied pressure. For example, a number 2 or a series of letters (such as A, B, C) could be returned based on the pressure applied at the keypress location for #2. This could dramatically simplify the user interface for text entry in a handheld device and increase the flexibility beyond current user interface capabilities.

As noted above, such strain sensors can also be used as a user input interface. To further illustrate this approach, the keypad keys 143 of this communication device 11 can each be comprised of a corresponding strain sensor, such that contact between a user's finger and a given strain sensor/key will be interpreted by the communication device 141 as a particular corresponding entry character as is otherwise generally well understood in the art.

Figure 15:
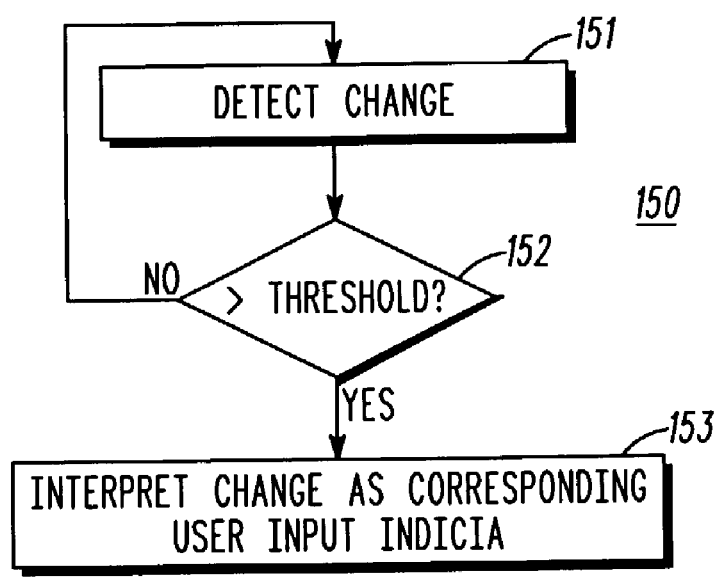
FIG. 15 comprises a flow diagram as configured in accordance with an embodiment of the invention.

In particular, and referring now to FIG. 15, such strain sensors can be used 150 to detect 151 a monitored change. In particular, pursuant to these various embodiments, one can monitor for a change in an electrical characteristic of a polymer-based resistive element by detecting a change in the resistance of the polymer-based resistive element. This change can then be compared 152 against, for example, a predetermined threshold, with a change that exceeds this threshold being interpreted 153 as corresponding user input indicia.

Detection 151 of a particular change can be defined as appropriate to a given application. For example, the particular change of concern can be the attainment of a given specific absolute parameter level (such as a given absolute level of voltage that itself corresponds to electrical resistance of the polymer-based resistive element). Because the characteristic electrical resistance of the polymer-based resistive element can often vary with temperature, however, such a static approach may not be appropriate for all operational settings. Instead, if desired, the process 150 can detect 151 a relatively rapid change in the monitored parameter over time. For example, the change of interest can be a rapid increase or decrease in resistance of the polymer-based resistive element as versus attainment of any particular specific level of resistance.

It will be appreciated that these various embodiments permit a relatively inexpensive, design-friendly, and reliable mechanism for detecting mechanical pressure and for, in particular, detecting a user's interaction with a corresponding mechanism or device.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. An apparatus comprising:
   a strain sensor comprising:
      a flexible substrate;
      at least a first polymer-based resistive element that comprises a user-assertable switch and that is at least partially conformably disposed on the flexible substrate;
      at least a first and second conductive lead disposed substantially co-planar to the first polymer-based resistive element and being electrically coupled to the resistive element.

2. The apparatus of claim 1 wherein the strain sensor further comprises an electrical impedance measuring circuit that is operably coupled to the resistive element via the first and second conductive leads.

3. The apparatus of claim 1 and further comprising strain detection means operably coupled to the first and second conductive leads for detecting a change in at least one monitored electrical characteristic of the resistive element, which change corresponds at least in part to an application of mechanical pressure to the resistive element.

4. The apparatus of claim 3 wherein the monitored electrical characteristic comprises impedance.

5. The apparatus of claim 4 wherein the impedance comprises resistance.

6. The apparatus of claim 1 wherein the flexible substrate comprises a plastic material.

7. The apparatus of claim 1 wherein there are a plurality of the polymer-based resistive elements conformably disposed on the flexible substrate.

8. The apparatus of claim 1 wherein the apparatus further comprises:
   a controller having a user input interface operably coupled to the strain sensor.

9. The apparatus of claim 1 wherein the polymer-based resistive element is substantially rectangular shaped.

10. The apparatus of claim 1 and further comprising at least a second polymer-based resistive element conformably disposed on the flexible substrate on a side of the flexible substrate that is opposite to the first polymer-based resistive element.

11. The apparatus of claim 1 wherein there are at least three of the conductive leads electrically coupled to the resistive element.

12. The apparatus of claim 1 wherein the flexible substrate has a reduced thickness proximal to the polymer-based resistive element.

13. The apparatus of claim 1 wherein the strain sensor further comprises a rigidizer disposed proximal to the flexible substrate such that portions of the flexible substrate that are distal to the polymer-based resistive element are rigidized.

14. The apparatus of claim 1 wherein the strain sensor further comprises:
   a second flexible substrate disposed substantially parallel to the flexible substrate;
   at least a second polymer-based resistive element at least partially conformably disposed on the second flexible substrate; and
   at least a first and second conductive lead electrically coupled to the second resistive element;
to yield a stack of resistive elements responsive to a single point of mechanical pressure.

15. The apparatus of claim 1 wherein the polymer-based resistive element comprises a printed application of conductive polymer material.

16. The apparatus of claim 15 wherein the conductive polymer material comprises carbon-filled material.

17. The apparatus of claim 15 wherein the conductive polymer material comprises at least one of:
   thermoplastic material; and
   thermoset material.

18. The apparatus of claim 1 wherein the apparatus comprises a handheld wireless communication device.

19. A method comprising:
   detecting a change in a monitored electrical characteristic of a polymer-based resistive element as disposed on a flexible substrate, which change at least exceeds a predetermined threshold;

interpreting the change as a corresponding indicia of a particular characteristic manner by which a given user physically interacts with a given corresponding monitored device.

20. The method of claim 19 wherein detecting a change in a monitored electrical characteristic of a polymer-based resistive element includes detecting a change in resistance of the polymer-based resistive element.

21. The method of claim 20 wherein detecting a change in resistance of the polymer-based resistive element includes detecting a relatively rapid change in resistance of the polymer-based resistive element.

22. The method of claim 20 wherein detecting a change in resistance of the polymer-based resistive element includes detecting a change in voltage as corresponds to resistance of the polymer-based resistive element.

23. The method of claim 19 wherein detecting a change in a monitored electrical characteristic of a polymer-based resistive element includes:

detecting a change in the electrical characteristic of the polymer-based resistive element as corresponds to a first dimension of the polymer-based resistive element; and detecting a change in the electrical characteristic of the polymer-based resistive element as corresponds to at least a second dimension of the polymer-based resistive element.

24. The method of claim 19 wherein interpreting the change as a corresponding user input indicia includes interpreting the change as a corresponding user input command.

25. The method of claim 19 wherein interpreting the change as a corresponding indicia of a particular characteristic manner by which a given user physically interacts with a given corresponding monitored device includes interpreting the change as a corresponding indicia of a particular characteristic manner by which a given user physically interacts with a given corresponding handheld device.

* * * * *